US012568314B2

(12) United States Patent　　　(10) Patent No.:　US 12,568,314 B2
Choi et al.　　　　　　　　　　　　(45) Date of Patent:　　　Mar. 3, 2026

(54) IMAGE SIGNAL PROCESSOR, METHOD OF OPERATING THE IMAGE SIGNAL PROCESSOR, AND APPLICATION PROCESSOR INCLUDING THE IMAGE SIGNAL PROCESSOR

(71) Applicant: SAMSUNG ELECTRONICS CO., LTD., Suwon-si (KR)

(72) Inventors: Seungwon Choi, Suwon-si (KR); Jiwon Choi, Suwon-si (KR); Seungmin Han, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 423 days.

(21) Appl. No.: 18/101,926

(22) Filed: Jan. 26, 2023

(65) Prior Publication Data

US 2023/0262343 A1　　Aug. 17, 2023

(30) Foreign Application Priority Data

Feb. 16, 2022　(KR) ........................ 10-2022-0020401
May 19, 2022　(KR) ........................ 10-2022-0061650

(51) Int. Cl.
　*H04N 23/741*　　(2023.01)
　*G06T 3/40*　　　(2024.01)
　*G06T 7/20*　　　(2017.01)
　*G06V 10/74*　　(2022.01)
(52) U.S. Cl.
　CPC ............ *H04N 23/741* (2023.01); *G06T 3/40* (2013.01); *G06T 7/20* (2013.01); *G06V 10/761*

(2022.01); *G06T 2207/10024* (2013.01); *G06T 2207/10144* (2013.01); *G06T 2207/20208* (2013.01)

(58) Field of Classification Search
　CPC .... H04N 23/741; H04N 23/60; G06V 10/761; G06V 10/74; G06T 7/20; G06T 2207/10024; G06T 2207/10144; G06T 2207/20208; G06T 3/40–4053; G06T 7/207
　See application file for complete search history.

(56) References Cited

U.S. PATENT DOCUMENTS

| | | | | |
|---|---|---|---|---|
| 8,866,927 | B2 * | 10/2014 | Levoy ................. | H04N 23/741 |
| | | | | 348/222.1 |
| 9,762,893 | B2 | 9/2017 | Barron et al. | |
| 10,158,797 | B2 | 12/2018 | Baghert et al. | |
| 11,017,509 | B2 * | 5/2021 | Bouzaraa ................. | G06T 5/10 |

(Continued)

FOREIGN PATENT DOCUMENTS

WO　　WO-2021025445 A1 *　2/2021　............... G06T 5/50

*Primary Examiner* — Utpal D Shah
*Assistant Examiner* — Jack Peter Kraynak
(74) *Attorney, Agent, or Firm* — Sughrue Mion, PLLC

(57) ABSTRACT

An image signal processor, a method of operating the image signal processor, and an application processor including the image signal processor are provided. The image signal processor includes: a low level image generation circuit configured to generate a plurality of low level images by reducing resolutions of a plurality of images; and a high dynamic range (HDR) circuit configured to generate a saturation map and a motion map based on the plurality of low level images, generate a stitch map by synthesizing the saturation map with the motion map, and generate an HDR image by applying a weight to the generated stitch map.

20 Claims, 12 Drawing Sheets

(56) References Cited

U.S. PATENT DOCUMENTS

| | | | | |
|---|---|---|---|---|
| 11,062,436 | B2 * | 7/2021 | Pekkucuksen | G06T 5/40 |
| 11,095,829 | B2 * | 8/2021 | Zhen | H04N 23/6812 |
| 11,363,213 | B1 * | 6/2022 | Song | G06T 7/20 |
| 2007/0242900 | A1 * | 10/2007 | Chen | H04N 23/741 |
| | | | | 382/294 |
| 2012/0218442 | A1 * | 8/2012 | Jandhyala | G06T 5/50 |
| | | | | 348/E5.051 |
| 2016/0352995 | A1 * | 12/2016 | Min | H04N 23/6811 |
| 2019/0138259 | A1 | 5/2019 | Bagaria et al. | |
| 2020/0099840 | A1 | 3/2020 | Nishio | |
| 2020/0236273 | A1 * | 7/2020 | Kang | H04N 5/265 |
| 2020/0396370 | A1 * | 12/2020 | Zhen | G06T 5/92 |
| 2023/0188862 | A1 * | 6/2023 | Maekelae | H04N 23/72 |
| | | | | 348/229.1 |

* cited by examiner

310

330

START

RECEIVE SATURATION MAP AND
MOTION MAP ──S301

UPSCALE RECEIVED SATURATION MAP
AND MOTION MAP ──S302

DETERMINE WEIGHTS OF SATURATION MAP
AND MOTION MAP ──S303

GENERATE STITCH MAP ──S304

END

IMAGE SIGNAL PROCESSOR, METHOD OF OPERATING THE IMAGE SIGNAL PROCESSOR, AND APPLICATION PROCESSOR INCLUDING THE IMAGE SIGNAL PROCESSOR

CROSS-REFERENCE TO RELATED APPLICATIONS

This application is based on and claims priority to Korean Patent Application Nos. 10-2022-0020401, filed on Feb. 16, 2022, and 10-2022-0061650, filed on May 19, 2022, in the Korean Intellectual Property Office, the disclosures of which are incorporated by reference herein in their entireties.

BACKGROUND

The present disclosure relates to an image signal processor, and more particularly, to an image signal processor which generates a saturation map and a motion map in order to output a high dynamic range (HDR) image, a method of operating the image signal processor, and an application processor including the image signal processor.

An image processing system, such as a camera, may include an image sensor which converts an optical signal incident on an optical lens into an electrical signal to generate an image and a processor which processes the generated image. The scope of brightness (i.e., dynamic range) that the image sensor may sense is less than the scope of brightness (i.e., dynamic range) that human eyes may sense. Therefore, an image of a scene captured in a backlit situation may appear different from how human eyes would perceive the scene. For example, the background may be too bright and the subject may be too dark. Therefore, an HDR technique for capturing the same subject with different exposure times to generate a plurality of images with different exposure times and processing the plurality of generated images to increase a dynamic range of an image is used.

SUMMARY

One or more embodiments provide an image signal processor generating a high dynamic range (HDR) image based on information on images, a method of operating the image signal processor, and an application processor including the image signal processor.

According to an aspect of an embodiment, an image signal processor image signal processor, which generates an HDR image based on a plurality of images provided by an image sensor, is provided. The image signal processor includes: a low level image generation circuit configured to generate a plurality of low level images by reducing resolutions of the plurality of images; and an HDR circuit configured to generate a saturation map and a motion map based on the plurality of low level images, generate a stitch map by synthesizing the saturation map with the motion map, and generate an HDR image by applying a weight to the generated stitch map.

According to an aspect of an embodiment, a method of operating an image signal processor to generate an HDR image based on a plurality of images provided by an image sensor, is provided. The method includes: reducing resolutions of the plurality of images to generate a plurality of low level images; generating a saturation map and a motion map based on the plurality of low level images; and generating an HDR image based on the saturation map and the motion map.

According to an aspect of an embodiment, a non-transitory computer-readable storage medium storing computer readable instructions is provided. When executed, the instructions cause the image signal processor to: generate a plurality of low level images by reducing resolutions of a plurality of images provided by an image sensor; generate a saturation map and a motion map based on the plurality of low level images; generate a stitch map by synthesizing the saturation map with the motion map; and generate a high dynamic range (HDR) image by applying a weight of the generated stitch map.

BRIEF DESCRIPTION OF THE DRAWINGS

The above and other aspects and features will be more clearly understood from the following description, taken in conjunction with the accompanying drawings, in which.

DETAILED DESCRIPTION

Hereinafter, embodiments will be described in detail with reference to the accompanying drawings. Embodiments described herein are example embodiments, and thus, the present disclosure is not limited thereto, and may be realized in various other forms. Each embodiment provided in the following description is not excluded from being associated with one or more features of another example or another example embodiment also provided herein or not provided herein but consistent with the present disclosure. It will be understood that when an element or layer is referred to as being "on," "connected to" or "coupled to" another element or layer, it can be directly on, connected or coupled to the other element or layer, or intervening elements or layers may be present. By contrast, when an element is referred to as being "directly on," "directly connected to" or "directly coupled to" another element or layer, there are no intervening elements or layers present. As used herein, the term "and/or" includes any and all combinations of one or more of the associated listed items. Expressions such as "at least one of," when preceding a list of elements, modify the entire list of elements and do not modify the individual elements of the list. For example, the expression, "at least one of a, b, and c," should be understood as including only a, only b, only c, both a and b, both a and c, both b and c, or all of a, b, and c.

Figure 1:
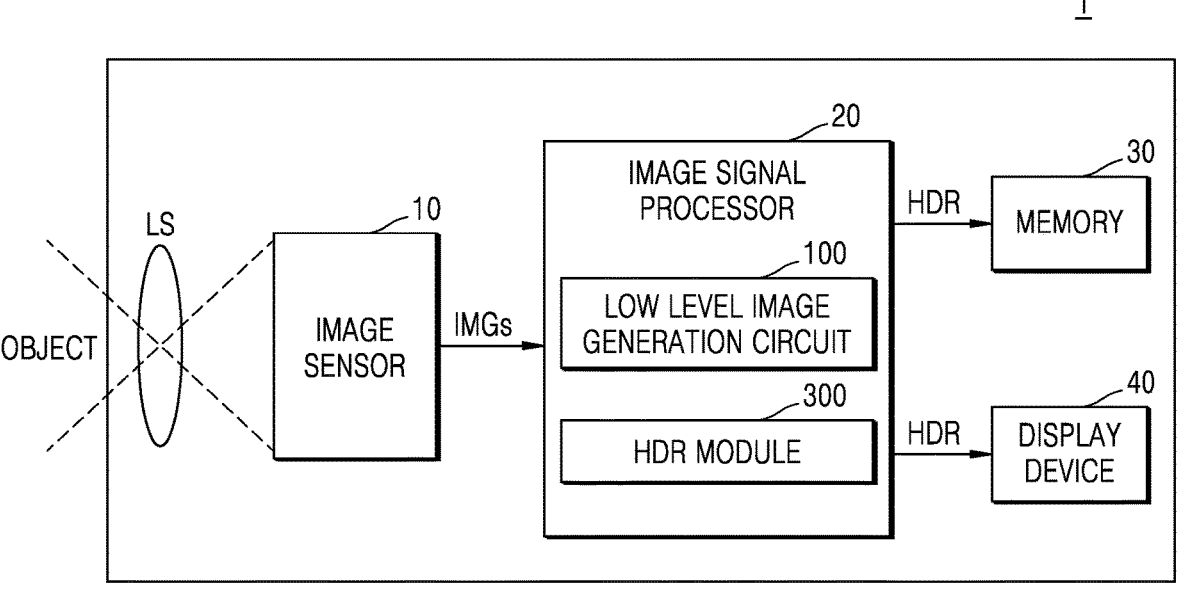
FIG. 1 is a block diagram illustrating an image processing system according to an embodiment.

FIG. 1 is a block diagram illustrating an image processing system 1 according to an embodiment.

The image processing system 1 may be embedded in an electronic device or may be implemented by an electronic device. The electronic device may capture an image, display the captured image, or perform an operation based on the captured image. The electronic device may include, for example, a digital camera, a smartphone, a wearable device, the internet of things (IoT), a personal computer (PC), a tablet PC, a personal digital assistant (PDA), a portable multimedia player (PMP), a navigator, or a drone. The electronic device may be mounted in a vehicle, medical equipment, furniture, a manufacturing facility, a security device, a door, or one of various measuring instruments as parts.

Referring to FIG. 1, the image processing system 1 may include an image sensor 10, an image signal processor 20, memory 30, and a display device 40.

The image sensor 10 may convert an optical signal of the subject incident on an optical lens LS into an electrical signal or an image (that is, image data). The image sensor 10 may include, for example, a pixel array including a plurality of two-dimensionally arranged pixels and a sensing circuit, and the pixel array may convert received light signals into electrical signals. The pixel array may include a photoelectric conversion element, such as a charge-coupled device (CCD) or a complementary metal oxide semiconductor (CMOS) conversion element, and may include various other photoelectric conversion elements. The sensing circuit may convert the electrical signals provided by the pixel array into an image and may output the image as the image data. The image sensor 10 may include a semiconductor chip including the pixel array and the sensing circuit.

The image sensor 10 may generate a plurality of images IMGs. The plurality of images IMGs may include a first image IMG 1 and a second image IMG 2. The first image IMG 1 may have a first property, and the second image IMG 2 may have a second property, wherein the second property is different from the first property. Here, the first property may be a short exposure, and the second property may be a long exposure. Also, the first image IMG 1 may be a long exposure image having the second property, and the second image IMG 2 may be a short exposure image having the first property. However, embodiments are not limited thereto.

The image sensor 10 may provide the first image IMG 1 and the second image IMG 2 to the image signal processor 20. The image signal processor 20 may generate a high dynamic range (HDR) image HDR, based on the first image IMG 1 and the second image IMG 2 received from the image sensor 10.

The image signal processor 20 may perform various image processing operations on the HDR image HDR or the first image IMG 1 and the second image IMG 2. For example, the image signal processor 20 may include various processing operations such as processing for improving picture quality, such as noise removal, brightness adjustment, and sharpness adjustment, and image processing for changing an image size and data format (for example, changing Bayer pattern image data to YUV or RGB image data). For example, the image signal processor 20 may process image data based on set white balance, parameter, and color space. The generated HDR image HDR may include a color spatial image, such as an RGB or YUV image. The size, for example, the resolution of the generated HDR image HDR, may be the same as that of the image data. The generated HDR image HDR may be stored in the memory 30 or may be provided to the display device 40. The generated HDR image HDR may be stored in the memory 30 and provided to the display device 40.

The memory 30 may include volatile memory, such as dynamic random access memory (DRAM) or static RAM (SRAM), or non-volatile memory, such as phase change RAM (PRAM), resistive RAM (ReRAM), or flash memory. The HDR image HDR stored in the memory 30 may be used by the image processing system 1 or stored in a storage device later.

The display device 40 may output the HDR image HDR provided by the image signal processor 20. For example, the image signal processor 20 may output the HDR image HDR by scaling the size, that is, resolution of the HDR image HDR, to fit resolution of the display device 40.

The image signal processor 20 may include a low level image generation circuit 100 and an HDR module 300.

Figure 2:
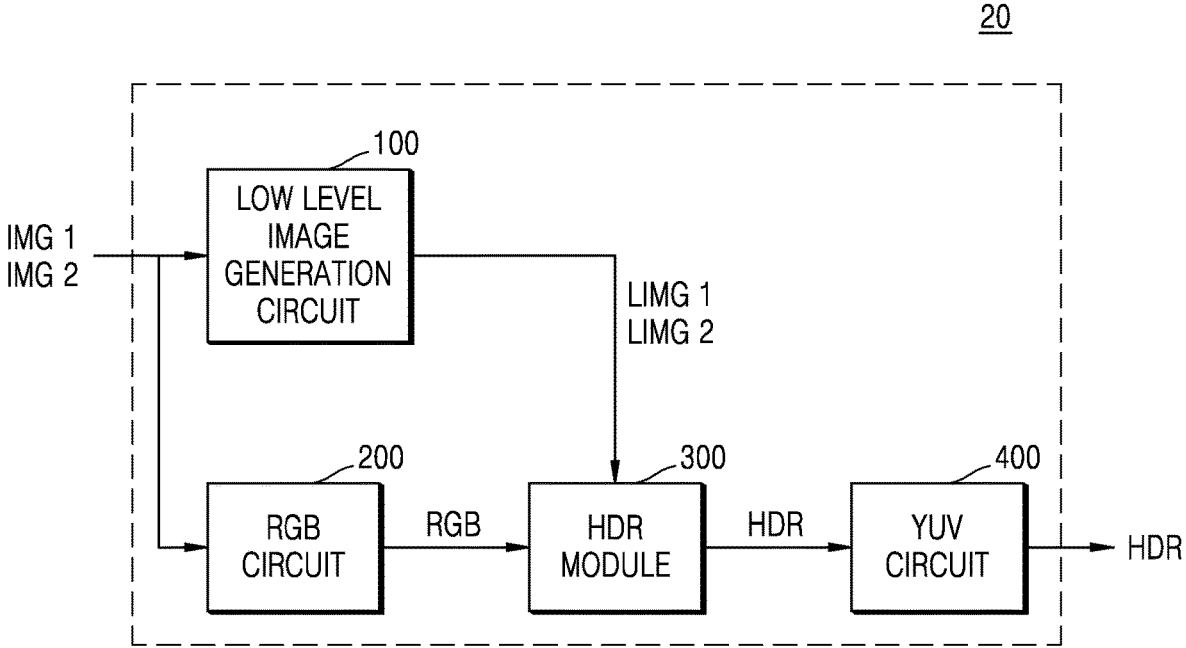
FIG. 2 is a block diagram schematically illustrating an image signal processor according to an embodiment.

Referring to FIGS. 1 and 2, the low level image generation circuit 100 may generate a plurality of low level images from the plurality of images IMGs obtained by the image sensor 10. For example, the low level image generation circuit 100 may generate low level images with smaller sizes than those of the images IMGs. The low level image generation circuit 100 may generate low level images with lower resolutions than those of the images IMGs.

Here, the plurality of low level images may include first low level images LIMG 1 and second low level images LIMG 2. The first low level image LIMG 1 may correspond to a low level image of the first image IMG 1, and the second low level image LIMG 2 may correspond to a low level image of the second image IMG 2. That is, the first low level image LIMG 1 may have a smaller size or lower resolution than those of the first image IMG 1, and the second low level image LIMG 2 may have a smaller size or lower resolution than those of the second image IMG 2.

In an embodiment, the first low level image LIMG 1 may have a first property, and the second low level image LIMG 2 may have a second property, wherein the second property is different from the first property. Here, the first property may be a short exposure, and the second property may be a long exposure. The first low level image LIMG 1 may be a long exposure image having the second property, and the second low level image LIMG 2 may be a short exposure image having the first property. However, embodiments are not limited thereto.

Referring to FIG. 1 again, the low level image generation circuit 100 may perform various processing operations, such as down scaling, down sampling, and compression, to generate the plurality of low level images by using the images IMGs. For example, down scaling may indicate processing of reducing the sizes or resolutions of the images IMGs. In down sampling, low level images of only one or some of a plurality of sampled samples may be generated. The low level images may be compressed by using various image compression algorithms, and there is no limit to a compression method.

The HDR module 300 may perform HDR processing on the plurality of low level images output from the low level image generation circuit 100. The HDR processing may include linearization processing and dynamic range compression (DRC) processing. The DRC processing may include tone mapping (for example, gamma correction). Depending on the tone mapping, in an image, a bright region may be corrected to be darkened and a dark region may be corrected to be brightened. As the HDR processing is performed on the plurality of low level images, an HDR image HDR with an increased dynamic range and an increased signal to noise ratio (SNR) may be generated. The various image processing operations described above may be performed on the HDR image. However, embodiments are not limited thereto, and at least one of the various image processing operations may be performed in an HDR processing process.

In the image processing system 1 according to the embodiment, as described above, the HDR module 300 of the image signal processor 20 may perform the HDR processing on the plurality of images IMGs, based on information on the plurality of images IMGs. Image quality may be improved by providing the HDR image HDR to the memory 30 or the display device 40.

A configuration of the image signal processor 20 and a method of generating the HDR image HDR are described in detail below.

FIG. 2 is a block diagram schematically illustrating an image signal processor according to an embodiment.

Referring to FIG. 2, the image signal processor 20 may include a low level image generation circuit 100, an RGB circuit 200, an HDR module 300, and a YUV circuit 400.

The low level image generation circuit 100 may generate a plurality of low level images from the plurality of images obtained by the image sensor 10 of FIG. 1. The plurality of images may include a first image IMG 1 and a second image IMG 2. The plurality of low level images may have smaller sizes than those of the first image IMG 1 and second image IMG 2 and/or lower resolutions than those of the first image IMG 1 and second image IMG 2. The plurality of low level images may include first low level images LIMG 1 and second low level images LIMG 2.

The RGB circuit 200 may change the first image IMG 1 and the second image IMG 2 received from the image sensor 10 of FIG. 1 in a Bayer pattern to the first image IMG 1 and the second image IMG 2 in an RGB format.

Figure 3:
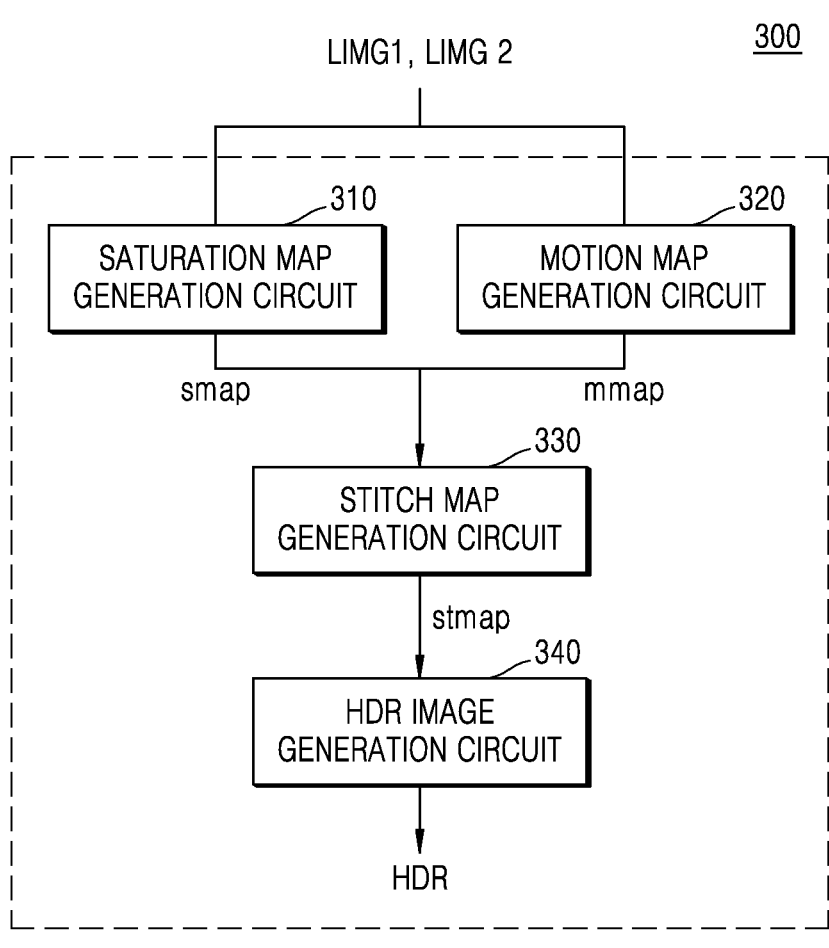
FIG. 3 is a block diagram schematically illustrating a high dynamic range (HDR) module of FIG. 2 according to an embodiment.

The HDR module 300 may receive the first image IMG 1 and the second image IMG 2 in the RGB format, which are output from the RGB circuit 200. The HDR module 300 may receive the first low level image LIMG 1 and the second low level image LIMG 2 generated by the low level image generation circuit 100. The HDR module 300 may generate an HDR image HDR by using the first low level image LIMG 1 and the second low level image LIMG 2. More specifically, the HDR module 300 may generate a saturation map smap and a motion map mmap, as illustrated in FIG. 3, by using the first low level image LIMG 1 and the second low level image LIMG 2. A stitch map stmap may be generated based on the generated saturation map smap and motion map mmap. The HDR image HDR may be generated by using the generated stitch map stmap. Referring to FIG. 2 again, the HDR module 300 may provide the generated HDR image HDR to the YUV circuit 400. A specific method and example of the HDR module 300 generating the HDR image HDR will be described in detail below.

Referring to FIGS. 1 and 2, the YUV circuit 400 may receive the HDR image HDR generated by the HDR module 300 and may change the received HDR image HDR to a YUV image. The YUV circuit 400 may provide the received HDR image HDR to the memory 30 or the display device 40 of FIG. 1.

FIG. 3 is a block diagram schematically illustrating the HDR module of FIG. 2 according to an embodiment.

Referring to FIG. 3, the HDR module 300 may include a saturation map generation circuit 310, a motion map generation circuit 320, a stitch map generation circuit 330, and an HDR image generation circuit 340. The saturation map generation circuit 310 may receive the first low level image LIMG 1 and the second low level image LIMG 2, and may generate the saturation map smap based on the first low level image LIMG 1 and the second low level image LIMG 2. Here, the saturation map smap may be obtained by mapping saturated regions of the first low level image LIMG 1 and the second low level image LIMG 2.

The motion map generation circuit 320 may receive the first low level image LIMG 1 and the second low level image LIMG 2, and may generate the motion map mmap the first low level image LIMG 1 and the second low level image LIMG 2. Here, the motion map mmap may be obtained by mapping motion regions of the first low level image LIMG 1 and the second low level image LIMG 2.

The stitch map generation circuit 330 may generate the stitch map stmap based on the saturation map smap generated by the saturation map generation circuit 310 and the motion map mmap generated by the motion map generation circuit 320. The stitch map stmap may be obtained by synthesizing and mapping the saturation map smap and the motion map mmap.

The HDR image generation circuit 340 may generate an HDR image HDR by performing a weight calculation based on the stitch map stmap generated by the stitch map generation circuit 330.

In the following drawings, configurations of the saturation map generation circuit 310, the motion map generation circuit 320, the stitch map generation circuit 330, and the HDR image generation circuit 340 and a map generating method are described in detail.

Figure 4:
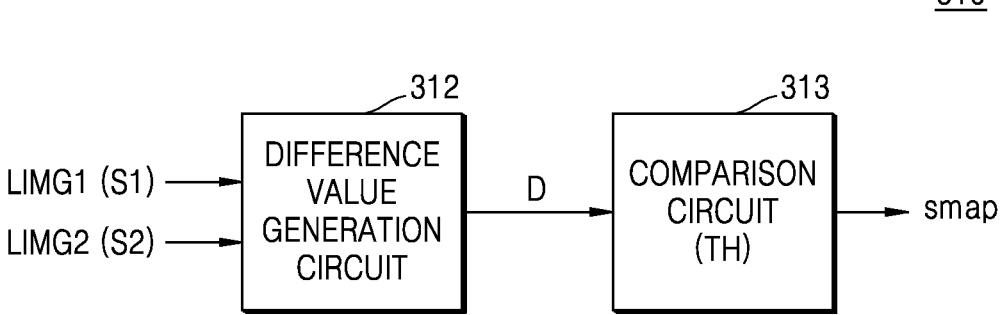
FIG. 4 is a block diagram schematically illustrating a saturation map generation circuit according to an embodiment.

FIG. 4 is a block diagram schematically illustrating a saturation map generation circuit 310 according to an embodiment.

Referring to FIG. 4, the saturation map generation circuit 310 may include a difference value generation circuit 312 and a comparison circuit 313.

The difference value generation circuit 312 may receive the first low level image LIMG 1 and the second low level image LIMG 2 generated by the low level image generation circuit 100 of FIG. 2. According to an embodiment, the two first low level image LIMG 1and the second low level image LIMG 2 may be two dimensional images which extend in first and second directions. The first direction may be a horizontal direction (for example, an x direction in two dimensions), and the second direction may be a vertical direction (for example, a y direction in two dimensions). Also, the first direction may be the vertical direction and the second direction may be the horizontal direction. Alternatively, the first direction may be the horizontal direction and the second direction may be the vertical direction orthogonal to the first direction or vice versa. The difference value generation circuit 312 may receive a first region value S1 at one point of the first low level image LIMG 1 in the first and second directions and a second region value S2 at a corresponding point of the second low level image LIMG 2.

The difference value generation circuit 312 may receive the first region value S1 and the second region value S2. The difference value generation circuit 312 may generate a difference value D from the first region value S1 and the second region value S2. In an embodiment, the difference value D may be obtained by subtracting the second region value S2 from the first region value S1, or by subtracting the first region value S1 from the second region value S2. The difference value D may be an absolute value that is a difference between the first region value S1 and the second region value S2, as illustrated by the following EQUATION 1.

$$D = |S1 - S2| \qquad \text{[EQUATION 1]}$$

wherein, S1 represents the first region value, S2 represents the second region value, and D represents the difference value between the first region value and the second region value. The difference value generation circuit 312 may generate the difference value D at each point of the first low level image LIMG 1 and the second low level image LIMG 2 on a two dimensional plane. For example, the first low level image LIMG 1 may have a plurality of regions which respectively corresponding to regions of the second low level image LIMG 2. A difference value D may be identified for each of the regions. For example, a region may include a single pixel. In this regard, each pixel of the first low level image LIMG 1 may correspond to a pixel of the second low level image LIMG 2, and the difference value generation circuit 312 may generate the difference value D for each pixel of the first low level image LIMG 1.

The comparison circuit 313 may receive the difference value D output from the difference value generation circuit 312. The comparison circuit 313 may compare the difference value D with a threshold value TH. In an embodiment, when the difference value D is greater than or equal to the threshold value TH, the saturation map smap may be generated by using a maximum saturation level MAX. When the difference value D is less than the threshold value TH, the saturation map smap may be generated by using a minimum saturation level MIN, as illustrated by the following EQUATION 2.

$$MAX = D \geq TH \ MIN = D < TH \qquad \text{[EQUATION 2]}$$

wherein, MAX represents the maximum saturation level, MIN represents the minimum saturation level, D represents the difference value, and TH represents the threshold value.

The maximum saturation level MAX and the minimum saturation level MIN may be levels of a binary image determined before generating the saturation map smap. The binary image may be obtained by reducing sizes or resolutions of the first image IMG 1 and the second image IMG 2 as original images.

The binary image having levels of the maximum saturation level MAX and the minimum saturation level MIN may pass through a low pass filter (LPF). The binary image passing through the LPF may be converted into a pyramid image. The binary image is converted into the pyramid image in order to minimize loss due to compression of the first image IMG 1 (illustrated in FIG. 2) and the second image IMG 2 (illustrated in FIG. 2) as the original images. After converting the binary image into the pyramid image, the pyramid image passes through an average filter and the LPF so that the saturation map smap may be generated, which is for preventing an unnatural boundary from being expressed in a process of performing upscaling in order to generate the stitch map stmap.

When the saturation map smap is generated by using the first low level image LIMG 1 and the second low level image LIMG 2 according to an embodiment, an HDR image with improved image quality may be generated. In particular, image quality of the dark region may be improved.

Figure 5:
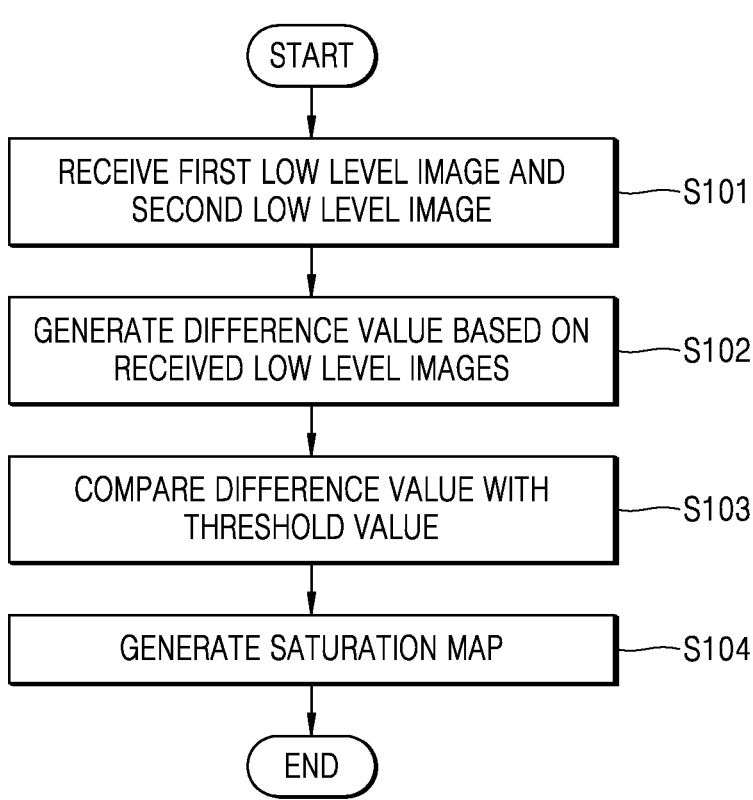
FIG. 5 is a flowchart illustrating a saturation map generating method according to an embodiment.

FIG. 5 is a flowchart illustrating a saturation map generating method according to an embodiment.

Referring to FIG. 5, the first low level image LIMG 1 and the second low level image LIMG 2 may be received in operation S101. The difference value generation circuit 312 of FIG. 4 may receive the first low level image LIMG 1 and the second low level image LIMG 2. The difference value generation circuit 312 may receive the first low level image LIMG 1, which extends in the first and second directions. The difference value generation circuit 312 may receive the second low level image LIMG 2, which extends in the first and second directions. The difference value generation circuit 312 may receive the first region value S1 and the second region value S2.

In an embodiment, the first direction may be the horizontal direction (for example, the x direction in two dimensions), and the second direction may be the vertical direction (for example, the y direction in two dimensions). Also, the first direction may be the vertical direction and the second direction may be the horizontal direction.

The difference value may be generated based on the received first and second low level images LIMG 1 and LIMG 2 in operation S102. The difference value generation circuit 312 of FIG. 4 may generate the difference value D from the first region value S1 and the second region value S2. In an embodiment, the difference value D may be obtained by subtracting the second region value S2 from the first region value S1, or by subtracting the first region value S1 from the second region value S2. That is, the difference value D may be the absolute value that is the difference between the first region value S1 and the second region value S2. For example, the first low level image LIMG 1 may have a plurality of regions which respectively corresponding to regions of the second low level image LIMG 2. A difference value D may be identified for each of the regions. For example, a region may include a single pixel. In this regard, each pixel of the first low level image LIMG 1 may correspond to a pixel of the second low level image LIMG 2, and the difference value generation circuit 312 may generate the difference value D for each pixel of the first low level image LIMG 1.

The difference value may be compared with the threshold value in operation S103. The comparison circuit 313 of FIG. 4 may compare the difference value D with the threshold value TH.

As a result of comparing the difference value with the threshold value, the saturation map may be generated in operation S104. For example, as illustrated in EQUATION 1 and EQUATION 2, when the difference value D is greater than or equal to the threshold value TH, the saturation map smap may be generated by using the maximum saturation level MAX. When the difference value D is less than the threshold value TH, the saturation map smap may be generated by using a minimum saturation level MIN.

The maximum saturation level MAX and the minimum saturation level MIN may be binary image levels determined before generating the saturation map smap. An operation in which the binary image that is the maximum saturation level MAX and the minimum saturation level MIN may pass through the LPF may be further included. The difference value D may be determined for each region of the low level images LIMG 1 and LIMG 2, and the comparison may be performed for each difference value D An operation of converting the binary image passing through the LPF into a pyramid image may be further included. An operation in which the pyramid image passes through the average filter and the LPF so that the saturation map smap may be generated, may be further included.

Figure 6:
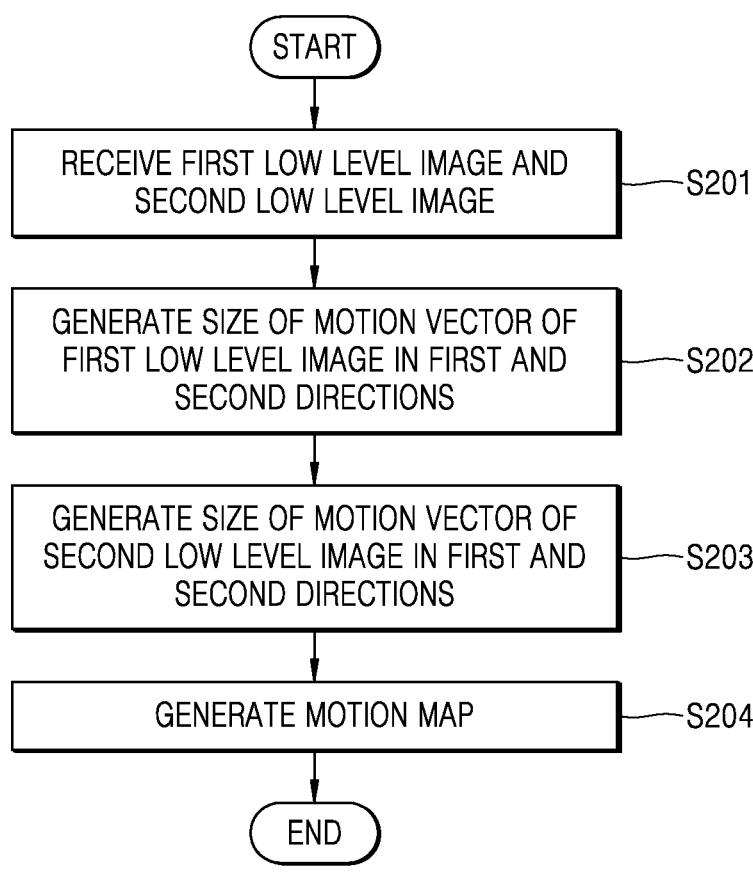
FIG. 6 is a flowchart illustrating a motion map generating method according to an embodiment.

FIG. 6 is a flowchart illustrating a motion map generating method according to an embodiment.

Referring to FIG. 6, first, the first low level image LIMG 1 and the second low level image LIMG 2 may be received in operation S201. The motion map generation circuit 320 of FIG. 3 may receive the first low level image LIMG 1 and the second low level image LIMG 2. The first low level image LIMG 1 may include the first and second directions. The second low level image LIMG 2 may include the first and second directions. The first direction may be the horizontal direction (for example, the x direction in two dimensions), and the second direction may be the vertical direction (for example, the y direction in two dimensions). The first direction may be the vertical direction and the second direction may be the horizontal direction.

Based on the received first low level image LIMG 1, the size of a motion vector in the first and second directions may be generated in operation S202. Herein, the motion vector may mean a vector for generating a motion map from the first low-level image LIMG1 and the second low-level image LIMG2. The first low level image LIMG1 and the second low level image LIMG2 are binary images and may include a first direction and a second direction. A motion vector including the first direction and the second direction may be generated in the first low-level image LIMG1, and a motion vector including the first direction and the second direction may be generated in the second low-level image LIMG2.

The first direction of the first low level image LIMG 1 may be the horizontal direction, and the second direction of the first low level image LIMG 1 may be the vertical direction orthogonal to the first direction. However, embodiments are not limited thereto. The motion map generation circuit 320 of FIG. 3 may generate the size of the motion vector of the first low level image LIMG 1 in the first and second directions. The size of the motion vector may be the same as a magnitude of an absolute value of the first low level image LIMG 1 in the first and second directions.

Based on the received second low level image LIMG 2, the size of the motion vector in the first and second directions may be generated in operation S203.

The first direction of the second low level image LIMG 2 may be the horizontal direction, and the second direction of the second low level image LIMG 2 may be the vertical direction orthogonal to the first direction. However, embodiments are not limited thereto. The motion map generation circuit 320 of FIG. 3 may generate the size of the motion vector of the second low level image LIMG 2 in the first and second directions. The size of the motion vector may be the same as a magnitude of an absolute value of the second low level image LIMG 2 in the first and second directions.

The motion map mmap may be generated by using sizes of motion vectors of the first low level image LIMG 1 and the second low level image LIMG 2 in the first and second directions in operation S204.

An operation of performing re-sizing in order to increase the sizes or resolutions of the first image IMG 1 and the second image IMG 2 as the original images may be further included.

Figure 7:
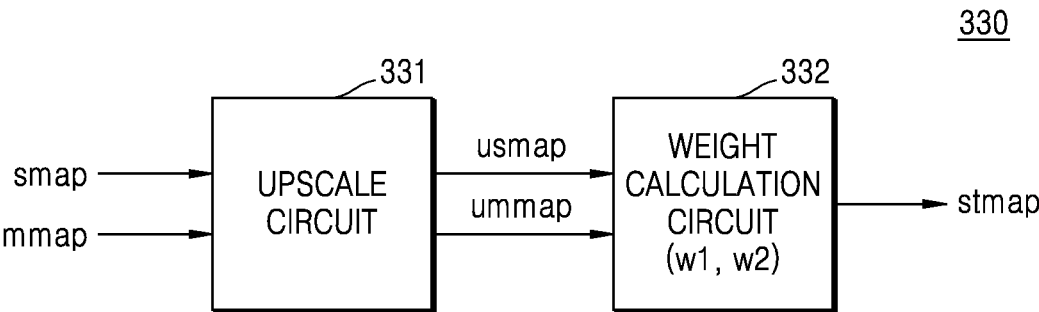
FIG. 7 is a block diagram schematically illustrating a stitch map generation circuit according to an embodiment.

FIG. 7 is a block diagram schematically illustrating a stitch map generation circuit according to an embodiment.

Referring to FIG. 7, the stitch map generation circuit 330 may include an upscale circuit 331 and a weight calculation circuit 332.

The upscale circuit 331 may receive the saturation map smap and the motion map mmap. The saturation map smap may be a result generated by the saturation map generation circuit 310, and the motion map mmap may be a result generated by the motion map generation circuit 320. The upscale circuit 331 may upscale the received saturation map smap and motion map mmap because the first low level image LIMG 1 and the second low level image LIMG 2 that are generated by the low level image generation circuit 100 are received in order to generate the saturation map smap and the motion map mmap. The upscale circuit 331 may generate an upscaled saturation map usmap and an upscaled motion map ummap.

The weight calculation circuit 332 may receive the upscaled saturation map usmap and the upscaled motion map ummap that are generated by the upscale circuit 331. The weight calculation circuit 332 may perform weight calculation by using a first weight value w1, a second weight value w2, the upscaled saturation map usmap, and the upscaled motion map ummap, as illustrated by the following EQUATION 3.

$$\text{stmap}=w1\times\text{usmap}+w2\times\text{ummap} \qquad \text{[EQUATION 3]}$$

wherein, stmap may represent the stitch map, w1 may represent the first weight value, and w2 may represent the second weight value.

In an embodiment, the first weight value w1 may be applied to the upscaled motion map ummap, and the second weight value w2 may be applied to the upscaled saturation map usmap, wherein the second weight value w2 is different from the first weight value w1. The second weight value w2 may be applied to the upscaled saturation map usmap, and the first weight value w1 may be applied to the upscaled motion map ummap, wherein the first weight value w1 is different from the second weight value w2. The first weight value w1 may be the same as or different from the second weight value w2. The first weight value w1 may be greater than the second weight value w2. However, embodiments are not limited thereto. The weight calculation circuit 332 may generate the stitch map stmap by performing weight calculation between the upscaled saturation map usmap and the upscaled motion map smmap.

Figure 8:
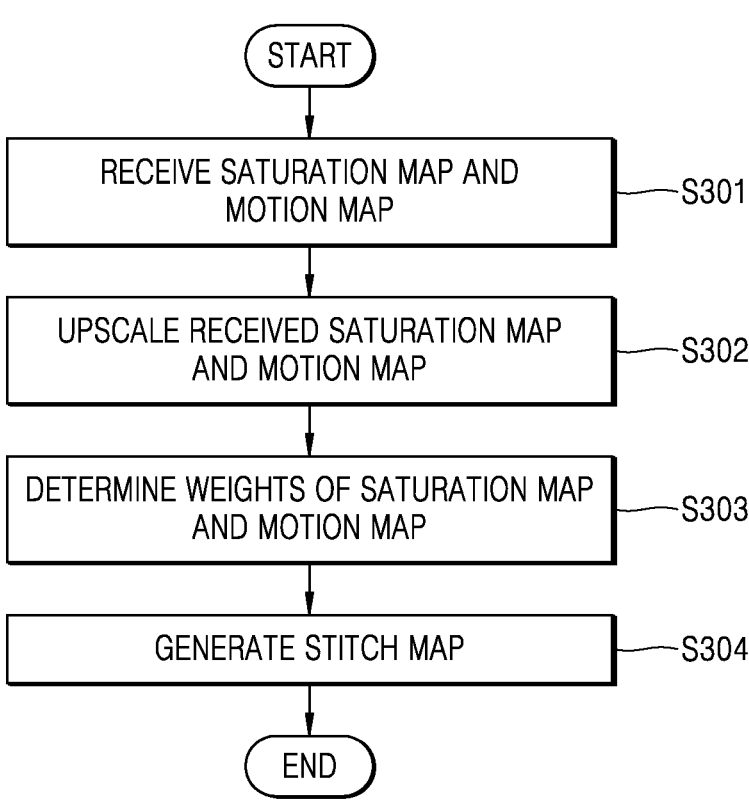
FIG. 8 is a flowchart illustrating a stitch map generating method according to an embodiment.

FIG. 8 is a flowchart illustrating a stitch map generating method according to an embodiment.

Referring to FIG. 8, first, the saturation map smap and the motion map mmap may be received in operation S301. The upscale circuit 331 of FIG. 7 may receive the saturation map smap and the motion map mmap.

The received saturation map smap and motion map mmap may be upscaled in operation S302. The upscale circuit 331 of FIG. 7 may upscale the saturation map smap and the motion map mmap to generate the upscaled saturation map usmap and the upscaled motion map ummap.

Weight calculation may be performed between the upscaled saturation map usmap and the upscaled motion map ummap in operation S303. For example, the first weight value w1 may be applied to the upscaled motion map ummap, and the second weight value w2 may be applied to the upscaled saturation map usmap, wherein the second weight value w2 is different from the first weight value w1. The first weight value w1 may be applied to the upscaled saturation map usmap, and the second weight value w2 may be applied to the upscaled motion map ummap, wherein the second weight value w2 is different from the first weight value w1.

Weight calculation may be performed between the upscaled saturation map usmap and the upscaled motion map ummap so that the stitch map stmap may be generated in operation S304. The stitch map stmap may be generated by and/or output from the stitch map generation circuit 330.

Figure 9:
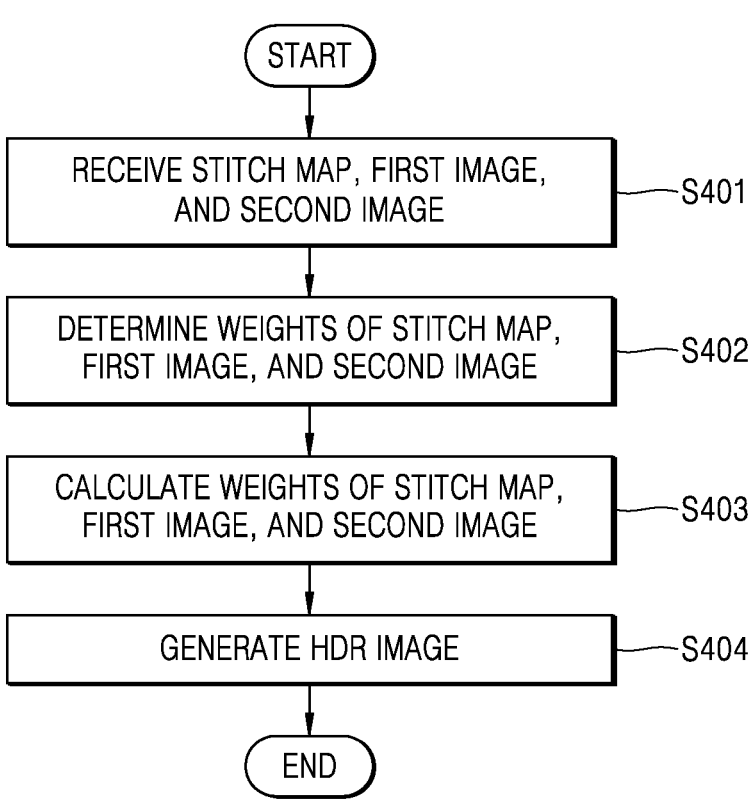
FIG. 9 is a flowchart illustrating an HDR image generating method according to an embodiment.

FIG. 9 is a flowchart illustrating an HDR image generating method according to an embodiment.

Referring to FIG. 9, first, the stitch map, the first image, and the second image may be received in operation S401. The first image IMG 1 may have a first property, and the second image IMG 2 may have a second property, wherein the second property is different from the first property. Here, the first property may be a short exposure, and the second property may be a long exposure. The first image IMG 1 may be the long exposure image having the second property, and the second image IMG 2 may be the short exposure image having the first property. However, embodiments are not limited thereto. The HDR image generation circuit 340 of FIG. 3 may receive the stitch map stmap, the first image IMG 1, and the second image IMG 2.

Weight values of the stitch map stmap, the first image IMG 1, and the second image IMG 2 may be determined in operation S402. The HDR image generation circuit 340 of FIG. 3 may determine the weight values of the stitch map stmap, the first image IMG 1, and the second image IMG 2.

Weight calculation may be performed among the stitch map stmap, the first image IMG 1, and the second image IMG 2 in operation S403. The HDR image generation circuit 340 of FIG. 3 may perform weight calculation on the stitch map stmap, the first image IMG 1, and the second image IMG 2, to which the weight values are given.

The HDR image on which weight calculation is performed may be generated in operation S404.

Figure 10:
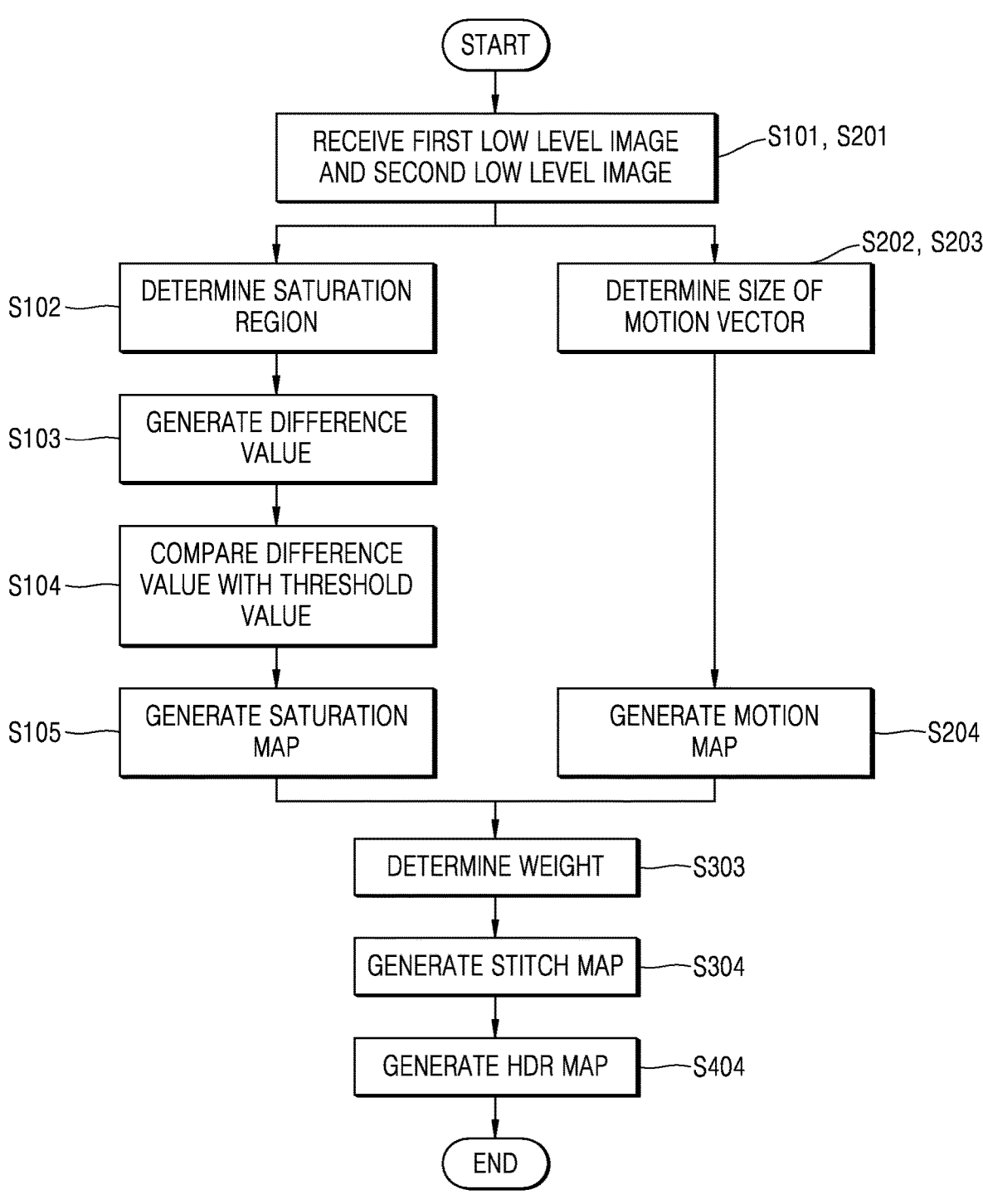
FIG. 10 is a flowchart illustrating an HDR image generating method according to an embodiment.

FIG. 10 is a flowchart illustrating an HDR image generating method according to an embodiment.

Referring to FIG. 10, first, the first low level image LIMG 1 and the second low level image LIMG 2 may be received in operations S101 and S201. In an embodiment, the first low level image LIMG 1 may have a first property, and the second low level image LIMG 2 may have a second property, wherein the second property is different from the first property. Here, the first property may be a short exposure, and the second property may be a long exposure. The first low level image LIMG 1 may be a long exposure image having the second property, and the second low level image LIMG 2 may be a short exposure image having the first property. However, embodiments are not limited thereto. For example, the saturation map generation circuit 310 and/or the motion map generation circuit 320 of FIG. 3 may receive the first low level image LIMG 1 and the second low level image LIMG 2.

The difference value may be generated based on the received first and second low level images LIMG 1 and LIMG 2 in operation S102. The difference value generation circuit 312 of FIG. 4 may generate the difference value D from the first region value S1 and the second region value S2. In an embodiment, the difference value D may be obtained by subtracting the second region value S2 from the first region value S1, or by subtracting the first region value S1 from the second region value S2. That is, the difference value D may be the absolute value that is the difference between the first region value S1 and the second region value S2. For example, the first low level image LIMG 1 may have a plurality of regions which respectively corresponding to regions of the second low level image LIMG 2. A difference value D may be identified for each of the regions. For example, a region may include a single pixel. In this regard, each pixel of the first low level image LIMG 1 may correspond to a pixel of the second low level image LIMG 2, and the difference value generation circuit 312 may generate the difference value D for each pixel of the first low level image LIMG 1.

At the same time as operation S102 and/or sequentially, the size of the motion vector in the first and second directions may be generated based on the received first and second low level images LIMG 1 and LIMG 2 in operations S202 and S203. The size of the motion vector may be the same as the size of the absolute value of each of the first low level image LIMG 1 and the second low level image LIMG 2 in the first and second directions. The first direction may be the horizontal direction, and the second direction may be the vertical direction orthogonal to the first direction. However, embodiments are not limited thereto.

The difference value may be compared with the threshold value in operation S104. For example, the comparison circuit 313 may compare the difference value D with the threshold value TH.

Then, based on a result of comparing the difference value with the threshold value, the saturation map may be generated in operation S105. For example, as illustrated in EQUATION 1 and EQUATION 2, when the difference value D is greater than or equal to the threshold value TH, the saturation map smap may be generated by using the maximum saturation level MAX. When the difference value D is less than the threshold value TH, the saturation map smap may be generated by using a minimum saturation level MIN.

At the same time as operation S105 and/or sequentially, the motion map mmap may be generated by using the size of the motion vector in the first and second directions of the first low level image LIMG 1 and the second low level image LIMG 2 in operation S204.

The weight value of the saturation map smap and the motion map mmap may be determined in operation S303. For example, the upscale circuit 331 of FIG. 7 may receive the saturation map smap and the motion map mmap. The weight values of the saturation map smap and the motion map mmap may be determined to be the same as or different from each other. For example, when the first or second region value S1 or S2 of the saturation region is greater than the size of the motion vector, the first weight value w1 may be applied to the upscaled motion map ummap and the second weight value w2 may be applied to the upscaled saturation map usmap, wherein the second weight value w2 is less than the first weight value w1. When the first or second region value S1 or S2 of the saturation region is less than the size of the motion vector, the first weight value w1 may be applied to the upscaled saturation map usmap and the second weight value w2 may be applied to the upscaled motion map ummap, wherein the second weight value w2 is less than the first weight value w1.

The stitch map stmap may be generated based on the saturation map smap and motion map mmap of which weight values are determined in operation S304. The stitch map stmap may be generated by and/or output from the stitch map generation circuit 330 of FIG. 3.

The HDR image may be generated based on the generated stitch map in operation S404.

Figure 11:
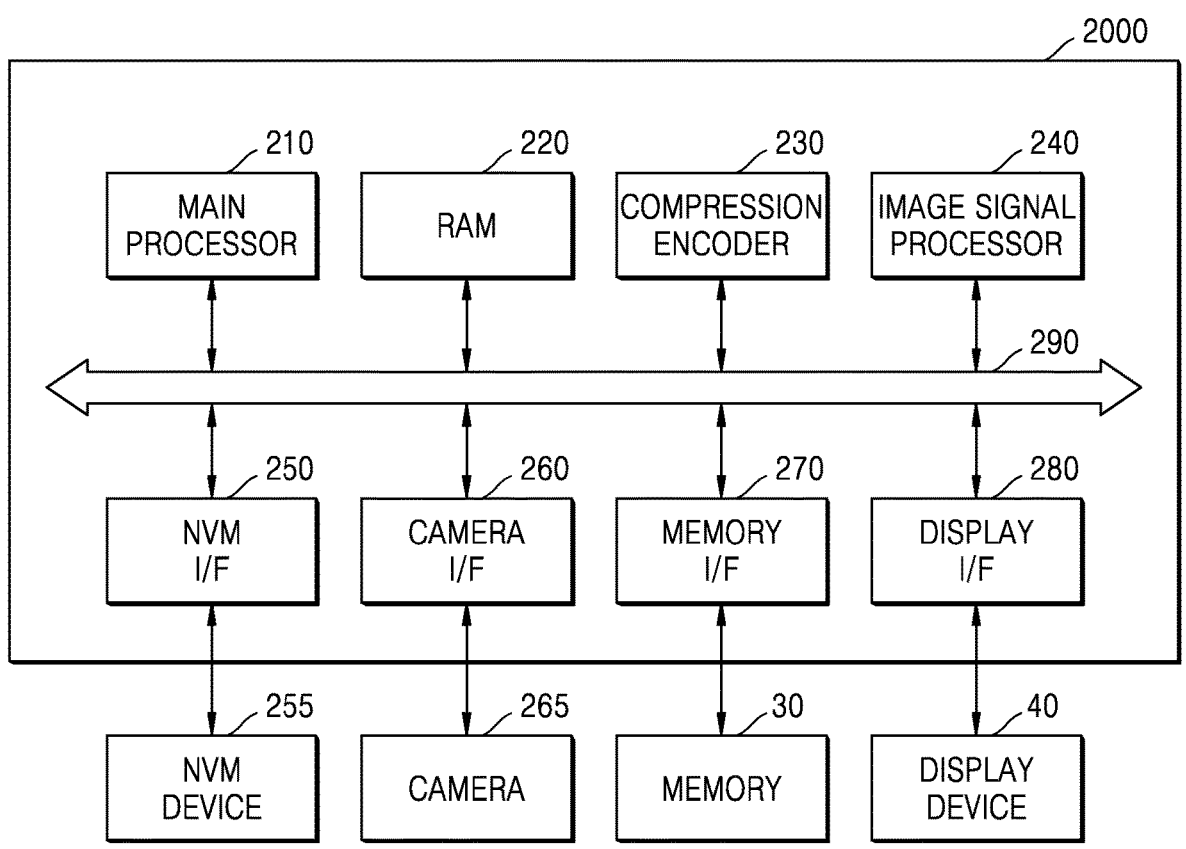
FIG. 11 is a block diagram illustrating an application processor according to an embodiment.

FIG. 11 is a block diagram illustrating an application processor 2000 according to an embodiment.

Referring to FIG. 11, the application processor 2000 may include a main processor 210, random access memory (RAM) 220, a compression encoder 230, an image signal processor 240, a non-volatile memory interface 250, a camera interface 260, a memory interface 270, and a display interface 280. The main processor 210, the RAM 220, the compression encoder 230, the image signal processor 240, the non-volatile memory interface 250, the camera interface 260, the memory interface 270, and the display interface 280 of the application processor 2000 may transmit and receive data to and from one another through a bus 290.

The main processor 210 may control the overall operation of the application processor 2000. The main processor 210 may include, for example, a central processing unit (CPU) or a microprocessor. According to an embodiment, the main processor 210 may include one computing component having two or more independent processors (or cores), that is, a multi-core processor. The main processor 210 may process or execute programs and/or data stored in the RAM 220 (or read only memory (ROM)).

The RAM 220 may temporarily store programs, data, and/or instructions. According to an embodiment, the RAM 220 may include dynamic RAM (DRAM) or SRAM. The RAM 220 may temporarily store an image input and output through the non-volatile memory interface 250, the camera interface 260, the memory interface 270, and the display interface 280 or generated by the image signal processor 240 or the main processor 210.

In an embodiment, the application processor 2000 may further include ROM. The ROM may store continuously used programs and/or data. The ROM may include erasable programmable ROM (EPROM) or electrically erasable programmable ROM (EEPROM).

The non-volatile memory interface 250 may interface with data input from or output to the non-volatile memory device 255. The non-volatile memory device 255 may include, for example, a memory card, such as a multimedia card (MMC), an embedded MMC (eMMC), a secure digital (SD) card, or a micro SD card.

The camera interface 260 may interface with data (for example, a raw image) input from the camera 265 outside the application processor 2000. The camera 265 may generate data on an image captured by using a plurality of light sensing elements. Image data received through the camera interface 260 may be provided to the image signal processor 240 or may be stored in the memory 30 through the memory interface 270. Image data received through the camera interface 260 may be provided to the image signal processor 240 and stored in the memory 30.

The memory interface 270 may interface with the data input from or output to the memory 30 outside the application processor 2000. According to an embodiment, the memory 30 may include volatile memory, such as DRAM or SRAM, or non-volatile memory, such as ReRAM, PRAM, or NAND flash.

The display interface 280 may interface with data (for example, an image) output to the display device 40. The display device 40 may output data on an image on a display, such as a liquid crystal display (LCD) or an active matrix organic light emitting diode (AMOLED) display.

The compression encoder 230 may encode an image to output an encoded image, that is, a compressed image. The compression encoder 230 may encode an HDR image output from the image signal processor 240 or an HDR image stored in the memory 30. In an embodiment, the compression encoder 230 may include a joint photographic experts group (JPEG) module that may output a JPEG format image. The JPEG format image may be stored in the non-volatile memory device 255.

The image signal processor 240 may perform image processing on a plurality of images provided by the camera 254 to generate a plurality of low level images, to generate a saturation map and a motion map by using the plurality of low level images, to generate a stitch map by using the generated saturation map and motion map, and to generate the HDR image based on the generated stitch map. The HDR image generated by the image signal processor 240 may be stored in the memory 30 or may be provided to the display device 40. The HDR image may be stored in the memory 30 and provided to the display device 40.

As described above with reference to FIGS. 1 to 10, the image signal processor 240 may generate the HDR image by using the saturation map, the motion map, and the stitch map during an HDR image generating operation. Image quality may be improved by generating the saturation map, the motion map, and the stitch map of one or more images to generate the HDR image. Therefore, the image signal processor 240 may synthesize the plurality of images (for example, long exposure images and short exposure images) input from the camera 254 to generate the HDR image with an increased dynamic range and improved synthetic quality.

Figure 12:
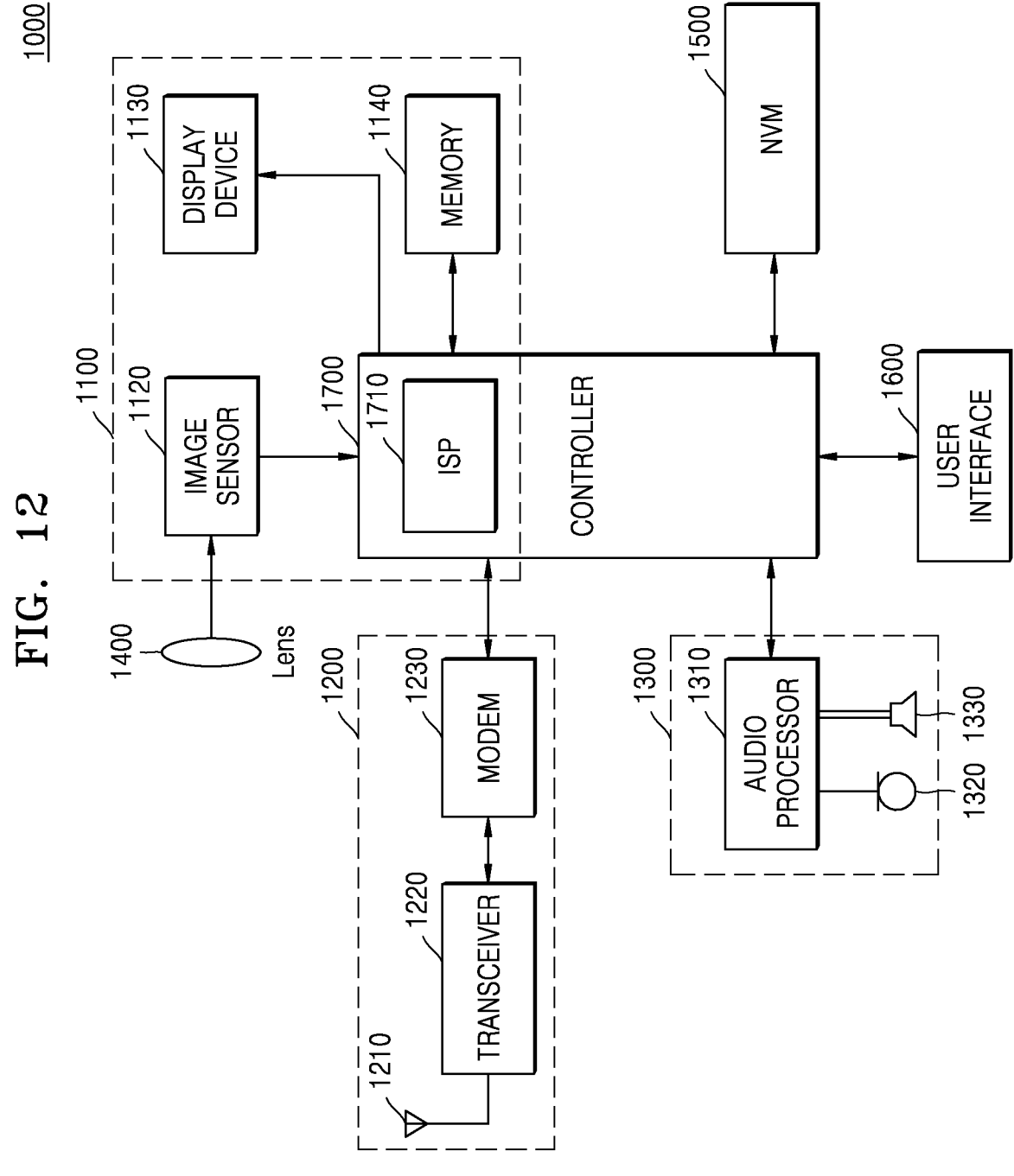
FIG. 12 is a block diagram illustrating a portable terminal according to an embodiment.

FIG. 12 is a block diagram illustrating a portable terminal 1000 according to an embodiment.

Referring to FIG. 12, the portable terminal 1000 according to the embodiment may include an image processing unit 1100, a radio transceiver 1200, an audio processing unit 1300, a lens 1400, non-volatile memory 1500, a user interface 1600, and a controller 1700.

The image processing unit 1100 may include an image sensor 1120, a display device 1130, memory 1140, and an image signal processor 1710. As illustrated in the embodiment, the image signal processor 1710 may be implemented as a part of the controller 1700.

The image signal processor 1710 may perform image processing on a plurality of images provided by the image sensor 1120 to generate a plurality of low level images, to generate a saturation map and a motion map by using the plurality of low level images, to generate a stitch map by using the generated saturation map and motion map, and to generate an HDR image based on the generated stitch map. The HDR image generated by the image signal processor 1710 may be stored in the memory 1140 or may be provided to the display device 1130. The HDR image may be stored in the memory 1140 and may be provided to the display device 1130.

As described above with reference to FIGS. 1 to 10, the image signal processor 1710 may generate the HDR image by using the saturation map, the motion map, and the stitch map during an HDR image generating operation. Image quality may be improved by generating the saturation map, the motion map, and the stitch map of one or more images to generate the HDR image based on the generated stitch map. Therefore, the image signal processor 1710 may synthesize the plurality of images (for example, long exposure images and short exposure images) input from the image sensor 1120 to generate the HDR image with an increased dynamic range and improved synthetic quality.

The radio transceiver 1200 includes an antenna 1210, a transceiver 1220, and a modem 1230. The audio processing unit 1300 may include an audio processor 1310, a microphone 1320, and a speaker 1330. The non-volatile memory 1500 may include a memory card such as an MMC, an eMMC, an SD card, or a micro SD card.

The user interface 1600 may include one of various devices, which may receive a user input, such as a keyboard, a curtain key panel, a touch panel, a fingerprint sensor, or a microphone. The user interface 1600 may receive the user input and may provide, to the controller 1700, a signal corresponding to the received user input.

The controller 1700 may include a system on chip (SoC) controlling an overall operation of the portable terminal 1000 and driving an application program or an operating system. A kernel of the operating system driven by the SoC may include an input and output scheduler and a device driver controlling the non-volatile memory 1500.

In some embodiments, each of the components represented by a block as illustrated in FIGS. 1-4, 7, 11 and 12 may be implemented as various numbers of hardware, software and/or firmware structures that execute respective functions described above, according to embodiments. For example, at least one of these components may include various hardware components including a digital circuit, a programmable or non-programmable logic device or array, an application specific integrated circuit (ASIC), transistors, capacitors, logic gates, or other circuitry using use a direct circuit structure, such as a memory, a processor, a logic circuit, a look-up table, etc., that may execute the respective functions through controls of one or more microprocessors or other control apparatuses. Also, at least one of these components may include a module, a program, or a part of code, which contains one or more executable instructions for performing specified logic functions, and executed by one or more microprocessors or other control apparatuses. The executable instructions may be stored on a non-transitory computer readable medium. Also, at least one of these components may further include or may be implemented by a processor such as a central processing unit (CPU) that performs the respective functions, a microprocessor, or the like. Functional aspects of embodiments may be implemented in algorithms that execute on one or more processors. Furthermore, the components, elements, modules or units represented by a block or processing steps may employ any number of related art techniques for electronics configuration, signal processing and/or control, data processing and the like.

While aspects of embodiments have been particularly shown and described, it will be understood that various changes in form and details may be made therein without departing from the spirit and scope of the following claims.

What is claimed is:

1. An image signal processor which generates a high dynamic range (HDR) image based on a plurality of images provided by an image sensor, the image signal processor comprising:
   a low level image generation circuit configured to generate a plurality of low level images by reducing resolutions of the plurality of images, wherein the plurality of low level images comprises first low level images, each having a first property, and second low level images, each having a second property; and
   an HDR circuit configured to generate a motion map based on the plurality of low level images, generate difference values based on the first low level images and the second low level images, generate a saturation map based on a comparison of the difference values with a threshold value, generate a stitch map by synthesizing the saturation map with the motion map, and generate an HDR image by applying a weight to the generated stitch map.

2. The image signal processor of claim 1, wherein the first property is a short exposure and the second property is a long exposure.

3. The image signal processor of claim 2, wherein the HDR circuit comprises:
   a saturation map generation circuit configured to generate the saturation map based on the first low level images and the second low level images;

a motion map generation circuit configured to generate the motion map based on the first low level images and the second low level images;
   a stitch map generation circuit configured to generate the stitch map based on the saturation map and the motion map; and
   an HDR image generation circuit configured to generate the HDR image based on the stitch map.

4. The image signal processor of claim 1, wherein the HDR circuit is further configured to generate a binary image based on the comparison of the difference values with the threshold value, and generate the saturation map based on the binary image.

5. The image signal processor of claim 3, wherein the motion map generation circuit is further configured to identify a magnitude of a motion vector of the first low level images and the second low level images, and
   wherein the HDR circuit is further configured to:
      identify a first weight and a second weight that is less than the first weight;
      upscale the saturation map and the motion map;
      identify, based on the magnitude of the motion vector, whether to apply the first weight to the upscaled saturation map and the second weight to the upscaled motion map, or to apply the second weight to the upscaled saturation map and the first weight to the upscaled motion map; and
      generate the stitch map by applying the identified weights to the upscaled saturation map and the upscaled motion map.

6. The image signal processor of claim 1, wherein the HDR circuit is further configured to perform a weight calculation between the saturation map and the motion map, identify a first weight and a second weight, upscale the saturation map and the motion map, and generate the stitch map by applying the first weight to the upscaled saturation map and the second weight to the upscaled motion map.

7. The image signal processor of claim 1, wherein the HDR circuit is further configured to upscale the saturation map and the motion map, and generate the stitch map by applying a first weight to the upscaled saturation map and a second weight to the upscaled motion map.

8. The image signal processor of claim 3, wherein the HDR image generation circuit is further configured to calculate a weight of each point in a two-dimensional region based on the stitch map and apply the weight to the plurality of images to generate the HDR image.

9. The image signal processor of claim 1, wherein a resolution of the HDR image is based on a resolution of a display device.

10. A method of operating an image signal processor to generate a high dynamic range (HDR) image based on a plurality of images provided by an image sensor, the method comprising:
   reducing resolutions of the plurality of images to generate a plurality of low level images, wherein the plurality of low level images comprises first low level images, each having a first property, and second low level images, each having a second property;
   generating a motion map based on the plurality of low level images;
   generating difference values based on the first low level images and the second low level images;
   generating a saturation map based on a comparison of the difference values with a threshold value; and
   generating an HDR image based on the saturation map and the motion map.

11. The method of claim 10, wherein the first property is a short exposure and the second property is a long exposure.

12. The method of claim 11, wherein the generating the HDR image comprises:

generating a stitch map based on the saturation map and the motion map; and generating the HDR image based on the stitch map.

13. The method of claim 12, wherein the generating the saturation map comprises:

receiving the first low level images and the second low level images;

generating a binary image based on the comparison of the difference values with the threshold value; and generating the saturation map based on the binary image.

14. The method of claim 12, further comprising:

identifying a magnitude of a motion vector of the first low level images and the second low level images;

identifying a first weight and a second weight that is less than the first weight;

upscaling the saturation map and the motion map;

identifying, based on the magnitude of the motion vector, whether to apply the first weight to the upscaled saturation map and the second weight to the upscaled motion map, or to apply the second weight to the upscaled saturation map and the first weight to the upscaled motion map; and generating the stitch map by applying the identified weights to the upscaled saturation map and the upscaled motion map.

15. The method of claim 12, further comprising:

performing a weight calculation between the saturation map and the motion map to identify a first weight and a second weight;

upscaling the saturation map and the motion map; and generating the stitch map by applying the first weight to the upscaled saturation map and the second weight to the upscaled motion map.

16. The method of claim 12, wherein the generating the stitch map comprises: upscaling the saturation map and the motion map; and applying a first weight to the upscaled saturation map and a second weight to the upscaled motion map to obtain the stitch map.

17. The method of claim 14, wherein the generating the HDR image comprises performing a weight calculation based on the generated stitch map.

18. A non-transitory computer-readable storage medium storing computer readable instructions which, when executed by an image signal processor, cause the image signal processor to:

generate a plurality of low level images by reducing resolutions of a plurality of images provided by an image sensor, wherein the plurality of low level images comprises first low level images, each having a first property, and second low level images, each having a second property;

generate a motion map based on the plurality of low level images;

generate difference values based on the first low level images and the second low level images;

generate a saturation map based on a comparison of the difference values with a threshold value;

generate a stitch map by synthesizing the saturation map with the motion map; and generate a high dynamic range (HDR) image by applying a weight of the generated stitch map.

19. The non-transitory computer-readable storage medium of claim 18, wherein the saturation map is generated based on the first low level images and the second low level images, and wherein the motion map is generated based on the first low level images and the second low level images.

20. The non-transitory computer-readable storage medium of claim 19, wherein the instructions, when executed by the image signal processor, further cause the image signal processor to:

identify a magnitude of a motion vector of the first low level images and the second low level images;

perform weight calculation between the saturation map and the motion map;

identify a first weight and a second weight that is less than the first weight;

upscale the saturation map and the motion map;

identify, based on the magnitude of the motion vector, whether to apply the first weight to the upscaled saturation map and the second weight to the upscaled motion map, or to apply the second weight to the upscaled saturation map and the first weight to the upscaled motion map; and generate the stitch map by applying the identified weights to the ups led saturation map and the unscaled motion map.

* * * * *